(12) United States Patent
Yefet et al.

(10) Patent No.: US 12,218,860 B2
(45) Date of Patent: Feb. 4, 2025

(54) COALESCING PACKETS BASED ON HINTS GENERATED BY NETWORK ADAPTER

(71) Applicant: Mellanox Technologies, Ltd., Yokneam (IL)

(72) Inventors: Gal Yefet, Haifa (IL); Avi Urman, Yokneam Illit (IL); Gil Kremer, Nazareth Illit (IL); Lior Narkis, Petah-Tikva (IL); Boris Pismenny, Haifa (IL)

(73) Assignee: Mellanox Technologies, Ltd, Yokneam (IL)

( * ) Notice: Subject to any disclaimer, the term of this patent is extended or adjusted under 35 U.S.C. 154(b) by 18 days.

(21) Appl. No.: 16/932,765

(22) Filed: Jul. 19, 2020

(65) Prior Publication Data
US 2022/0021629 A1    Jan. 20, 2022

(51) Int. Cl.
*H04L 49/90* (2022.01)
*G06F 9/54* (2006.01)
*H04L 47/2441* (2022.01)
*H04L 69/22* (2022.01)

(52) U.S. Cl.
CPC .......... *H04L 49/9042* (2013.01); *G06F 9/545* (2013.01); *H04L 47/2441* (2013.01); *H04L 69/22* (2013.01)

(58) Field of Classification Search
CPC .......... G06F 13/4027; G06F 15/17331; G06F 9/545; H04L 67/1097; H04L 49/901; H04L 49/9057; H04L 69/22; H04L 49/9042; H04L 47/2441
See application file for complete search history.

(56) References Cited

U.S. PATENT DOCUMENTS

| 6,728,265 B1* | 4/2004 | Yavatkar | H04L 43/00 370/395.42 |
| 6,799,200 B1* | 9/2004 | Blackmore | G06F 12/1081 709/212 |
| 7,209,994 B1 | 4/2007 | Klaiber et al. | |

(Continued)

FOREIGN PATENT DOCUMENTS

WO    2015074275 A1    5/2015

OTHER PUBLICATIONS

Corbert, "A reworked TCP zero-copy receive API", LWN.net, pp. 1-4, May 18, 2018 downloaded from https://lwn.net/Articles/754681/.

(Continued)

*Primary Examiner* — Yee F Lam
(74) *Attorney, Agent, or Firm* — Meitar Patents Ltd.; Daniel Kligler

(57) ABSTRACT

A network node includes a network adapter and a host. The network adapter is coupled to a communication network. The host includes a processor running a client process and a communication stack, and is configured to receive packets from the communication network, and classify the received packets into respective flows that are associated with respective chunks in a receive buffer, to distribute payloads of the received packets among the chunks so that payloads of packets classified to a given flow are stored in a given chunk assigned to the given flow, and to notify the communication stack of the payloads in the given chunk, for transferring the payloads in the given chunk to the client process.

26 Claims, 5 Drawing Sheets

(56) References Cited

U.S. PATENT DOCUMENTS

| | | | |
|---|---|---|---|
| 7,222,203 B2 | 5/2007 | Madukkarumukumana et al. | |
| 7,302,511 B2 | 11/2007 | Jeyasingh et al. | |
| 7,616,563 B1 | 11/2009 | Eriksson et al. | |
| 7,826,469 B1 | 11/2010 | Li et al. | |
| 7,930,349 B2 | 4/2011 | Hussain et al. | |
| 8,175,116 B2* | 5/2012 | Tachibana | H04L 47/36 370/470 |
| 8,180,944 B2 | 5/2012 | Serebrin et al. | |
| 8,213,315 B2 | 7/2012 | Crupnicoff et al. | |
| 8,306,062 B1 | 11/2012 | Cohen | |
| 8,566,494 B2 | 10/2013 | Li et al. | |
| 8,589,587 B1 | 11/2013 | Michailidis et al. | |
| 8,886,862 B2 | 11/2014 | Kagan | |
| 8,897,132 B2 | 11/2014 | Feroz et al. | |
| 8,949,498 B2 | 2/2015 | Kagan | |
| 8,996,718 B2 | 3/2015 | Biswas | |
| 9,112,819 B2 | 8/2015 | Gopinath et al. | |
| 9,178,805 B2 | 11/2015 | Goel | |
| 9,306,793 B1 | 4/2016 | Craft et al. | |
| 9,391,956 B2 | 7/2016 | Touboul | |
| 9,571,354 B2 | 2/2017 | Annamalaisami et al. | |
| 9,916,269 B1 | 3/2018 | Machulsky et al. | |
| 9,965,412 B2 | 5/2018 | Liu et al. | |
| 9,965,441 B2 | 5/2018 | Sajeepa et al. | |
| 10,015,104 B2 | 7/2018 | Pope et al. | |
| 10,110,518 B2 | 10/2018 | Burstein et al. | |
| 10,380,047 B2 | 8/2019 | Degani | |
| 10,387,074 B2 | 8/2019 | Kriss et al. | |
| 10,467,161 B2 | 11/2019 | Gilboa et al. | |
| 10,505,747 B2 | 12/2019 | Pope et al. | |
| 10,505,848 B2 | 12/2019 | Underwood et al. | |
| 10,642,775 B1* | 5/2020 | Voks | G06F 13/4059 |
| 11,451,647 B2 | 9/2022 | Lariviere et al. | |
| 11,533,267 B2 | 12/2022 | Friedman et al. | |
| 2005/0165985 A1 | 7/2005 | Vangal et al. | |
| 2006/0045109 A1* | 3/2006 | Blackmore | H04L 69/32 370/402 |
| 2006/0075142 A1 | 4/2006 | Cornett et al. | |
| 2006/0182039 A1 | 8/2006 | Jourdain et al. | |
| 2008/0294825 A1 | 11/2008 | Mahalingam et al. | |
| 2010/0023666 A1 | 1/2010 | Mansell et al. | |
| 2010/0070677 A1 | 3/2010 | Thakkar | |
| 2010/0115514 A1 | 5/2010 | Maliszewski et al. | |
| 2010/0174841 A1 | 7/2010 | Bogin et al. | |
| 2010/0191885 A1 | 7/2010 | Serebrin et al. | |
| 2010/0191887 A1 | 7/2010 | Serebrin et al. | |
| 2010/0191888 A1 | 7/2010 | Serebrin et al. | |
| 2010/0191889 A1 | 7/2010 | Serebrin et al. | |
| 2010/0271944 A1 | 10/2010 | Michaelis et al. | |
| 2010/0333101 A1 | 12/2010 | Pope et al. | |
| 2011/0106993 A1 | 5/2011 | Arinobu et al. | |
| 2011/0145459 A1 | 6/2011 | Conti et al. | |
| 2011/0179417 A1 | 7/2011 | Inakoshi | |
| 2012/0079175 A1 | 3/2012 | Flynn et al. | |
| 2012/0179742 A1 | 7/2012 | Acharya et al. | |
| 2013/0067193 A1 | 3/2013 | Kagan et al. | |
| 2013/0315054 A1 | 11/2013 | Shamis et al. | |
| 2014/0006667 A1 | 1/2014 | Sun et al. | |
| 2014/0040514 A1 | 2/2014 | Li et al. | |
| 2014/0143455 A1* | 5/2014 | Hayut | H04L 12/4641 710/19 |
| 2014/0229946 A1 | 8/2014 | van Riel | |
| 2014/0280813 A1 | 9/2014 | Ramachandran et al. | |
| 2014/0304352 A1 | 10/2014 | Chaudhary et al. | |
| 2014/0310369 A1* | 10/2014 | Makhervaks | G06F 13/14 709/207 |
| 2014/0310439 A1 | 10/2014 | Bshara et al. | |
| 2015/0127849 A1 | 5/2015 | Luo et al. | |
| 2015/0172226 A1* | 6/2015 | Borshteen | H04L 49/9057 370/412 |
| 2015/0256654 A1 | 9/2015 | Oguchi | |
| 2015/0257159 A1 | 9/2015 | Speicher et al. | |
| 2015/0263968 A1 | 9/2015 | Jain et al. | |
| 2015/0286594 A1 | 10/2015 | Degani | |
| 2015/0304281 A1 | 10/2015 | Kasturi et al. | |
| 2016/0057070 A1 | 2/2016 | Saxena et al. | |
| 2016/0092238 A1 | 3/2016 | Codrescu et al. | |
| 2016/0234127 A1 | 8/2016 | Agarwal et al. | |
| 2016/0277478 A1 | 9/2016 | Narasimhamurthy | |
| 2016/0286487 A1 | 9/2016 | Sachs et al. | |
| 2017/0048320 A1* | 2/2017 | Farmahini-Farahani | H04L 67/1097 |
| 2017/0249079 A1* | 8/2017 | Mutha | G06F 3/067 |
| 2018/0004705 A1 | 1/2018 | Menachem et al. | |
| 2018/0167168 A1 | 6/2018 | Shoens et al. | |
| 2018/0191629 A1 | 7/2018 | Biederman et al. | |
| 2018/0191642 A1 | 7/2018 | Biederman et al. | |
| 2018/0267919 A1* | 9/2018 | Burstein | G06F 13/4027 |
| 2018/0323913 A1 | 11/2018 | Chen | |
| 2019/0044994 A1 | 2/2019 | Sarangam et al. | |
| 2019/0116127 A1 | 4/2019 | Pismenny et al. | |
| 2019/0229903 A1 | 7/2019 | Balasubramanian et al. | |
| 2019/0238460 A1 | 8/2019 | Vasudevan | |
| 2019/0260686 A1 | 8/2019 | Bowers et al. | |
| 2019/0342199 A1 | 11/2019 | Hurson et al. | |
| 2019/0387079 A1 | 12/2019 | Pismenny et al. | |
| 2020/0068048 A1 | 2/2020 | Hermesh et al. | |
| 2020/0117605 A1 | 4/2020 | Cornett et al. | |
| 2020/0133909 A1 | 4/2020 | Hefty et al. | |
| 2020/0210359 A1 | 7/2020 | Cornett et al. | |
| 2020/0313999 A1 | 10/2020 | Lee et al. | |
| 2020/0389399 A1 | 12/2020 | Wang et al. | |
| 2020/0403919 A1 | 12/2020 | Cui et al. | |
| 2020/0412659 A1 | 12/2020 | Arditti Ilitzky et al. | |
| 2021/0092069 A1 | 3/2021 | Musleh et al. | |
| 2021/0117360 A1 | 4/2021 | Kutch et al. | |
| 2021/0243247 A1 | 8/2021 | He et al. | |
| 2021/0288910 A1 | 9/2021 | Daly et al. | |
| 2021/0297369 A1 | 9/2021 | Park et al. | |
| 2021/0320866 A1 | 10/2021 | Le et al. | |
| 2021/0328930 A1 | 10/2021 | Nikolaidis et al. | |
| 2021/0352023 A1 | 11/2021 | Syrivelis et al. | |
| 2022/0085916 A1 | 3/2022 | Debbage et al. | |
| 2022/0124182 A1 | 4/2022 | Galles et al. | |
| 2022/0321478 A1 | 10/2022 | Vasudevan et al. | |
| 2023/0259284 A1 | 8/2023 | Han et al. | |

OTHER PUBLICATIONS

Kernelnewbies, "Linux4.18—Linux Kernel Newbies", pp. 1-16, Aug. 12, 2018 downloaded from https://kernelnewbies.org/Linux_4.18.

Mellanox Technologies, "WinOF VPI for Windows", User Manual, pp. 1-117, Rev 4.40, Jul. 9, 2013.

Melllanox Technologies, "Linux/drivers/net/ethernet/mellanox/mlx4/en_cq.c", version 4.1, pp. 1-4, year 2007.

Mellanox Technologies, "Linux/drivers/net/ethernet/mellanox/mlx4/en_netdev.c", version 4.1, pp. 1-41, year 2007.

Intel Corporation, "Linux/drivers/net/ethernet/intel/ixgbe/ixgbe_main.c", pp. 1-92, version 4.1., years 1999-2014.

Intel Corporation, "Intel® Xeon® Processor E5-2600 v31 Product Family", Product brief, pp. 1-5, Aug. 21, 2014.

Pismenny et al., U.S. Appl. No. 17/108,002, filed Dec. 1, 2020.

NVMe Over Fabrics standard, "NVM Express over Fabrics," Revision 1.1, pp. 1-82, Oct. 22, 2019.

Rescorla et al., "The Transport Layer Security (TLS) Protocol Version 1.3", Request for Comments 8446, pp. 1-160, Aug. 2018.

Belshe et al., "Hypertext Transfer Protocol Version 2 (HTTP/2)", Request for Comments 7540, pp. 1-96, May 2015.

Microsoft, "Receive Segment Coalescing (RSC)", pp. 1-3, Aug. 31, 2016 downloaded from https://docs.microsoft.com/en-us/previous-versions/windows/it-pro/windows-server-2012-r2-and-2012/hh997024(v=ws.11)#receive-segment-coalescing-rsc-1.

U.S. Appl. No. 17/151,697 Office Action dated Mar. 3, 2022.

U.S. Appl. No. 17/151,697 Office Action dated Jun. 16, 2022.

U.S. Appl. No. 17/582,047 Offie Action dated Jun. 23, 2023.

CN Application # 202110756878.8 Office Action dated Feb. 29, 2024.

U.S. Appl. No. 17/990,768 Office Action dated Mar. 14, 2024.

(56) References Cited

OTHER PUBLICATIONS

Nvidia, "CUDA Compute Unified Device Architecture", pp. 1-125, Jun. 23, 2007.
Infiniband Trade Association, "InfiniBandTM Architecture Specification", vol. 1, Release 1.3, pp. 1-1842, Mar. 3, 2015.
Friedman, U.S. Appl. No. 17/902,150, filed Sep. 2022.
U.S. Appl. No. 17/990,768 Office Action dated Sep. 14, 2023.

* cited by examiner

COALESCING PACKETS BASED ON HINTS GENERATED BY NETWORK ADAPTER

TECHNICAL FIELD

Embodiments described herein relate generally to data communication, and particularly to methods and systems for coalescing packets based on hints generated by network adapter.

BACKGROUND

Client processes running on a host computer may access a communication network using a suitable communication protocol. For example, a client process may access the transport layer of a communication protocol, e.g., the Transmission Control Protocol (TCP), using a software interface known as a "socket."

Methods for interfacing a transport layer using sockets are known in the art. For example, U.S. Patent Application Publication 2014/0229946 describes systems and methods for enabling network communication I/O operations to virtual machines. An example method may include: identifying a network packet destined for a virtual process controlled by a guest operating system, identifying a memory location corresponding to a virtual memory location utilized by the virtual process, and copying data from the network packet into the memory location corresponding to the virtual memory location. Another example method may include: retrieving, from a first memory location, data to be included in a network packet, wherein the first memory location corresponds to a virtual memory location utilized by a virtual process controlled by a guest operating system, retrieve, from a second memory location, a header to be included in the network packet, wherein the second memory location corresponds to a kernel buffer location of the guest operating system, and combining the header and the data to form the network packet.

SUMMARY

An embodiment that is described herein provides a network node, including a network adapter and a host. The network adapter is coupled to a communication network. The host includes a processor running a client process and a communication stack, and is configured to receive packets from the communication network, and classify the received packets into respective flows that are associated with respective chunks in a receive buffer, to distribute payloads of the received packets among the chunks so that payloads of packets classified to a given flow are stored in a given chunk assigned to the given flow, and to notify the communication stack of the payloads in the given chunk, for transferring the payloads in the given chunk to the client process.

In some embodiments, the processor is further configured to run a driver that mediates between the network adapter and the communication stack, and the network adapter is configured to notify the communication stack of the payloads in the given chunk, via the driver. In other embodiments, the driver is configured to construct a coalesced payload including two or more consecutive payloads in the given chunk, and to notify the communication stack of the coalesced payload. In yet other embodiments, the payloads in the given chunk include first and second payloads that meet a matching criterion for coalescing, and the driver is configured to refrain from coalescing the first and second payloads based on a criterion other than the matching criterion.

In an embodiment, first and second payloads in the given chunk belong to packets of different respective flows, and the network adapter is configured to notify the driver that the first and second payloads mismatch for coalescing. In another embodiment, in response to detecting that a storage space available in the given chunk is smaller than a payload to be stored in the given chunk, the network adapter is configured to assign to the given flow another chunk, and to store the payload in the another chunk. In yet another embodiment, in response to detecting that a storage space available in the given chunk is smaller than a payload to be stored in the given chunk, the network adapter is configured to assign to the given flow another chunk, and to split storage of the payload between the chunk and the another chunk.

In some embodiments, the received packets belong to at least first and second flows, and the network adapter is configured to assign to the first and second flows different respective chunks in the receive buffer. In other embodiments, the communication stack is configured to apply direct data transfer of two or more payloads stored contiguously in the chunk to a user space. In yet other embodiments, the receive buffer resides in a memory of the host, and the communication stack is configured to apply the direct data transfer only when the two or more payloads (i) are aligned in the receive buffer to the operating-system pages and (ii) having an operating-system page granularity.

In an embodiment, the communication stack is included in a kernel of an operating system running in a kernel space, and the communication stack is configured to transfer one or more payloads in the given chunk to the client process in a user space. In another embodiment, the communication stack includes a communication program running in a user space, and the communication stack is configured to transfer one or more payloads in the given chunk directly to the client process in the user space. In yet another embodiment, the network adapter is configured to store headers of the received packets in a header buffer, and to notify the communication stack of the stored headers corresponding to payloads of the received packets in the given chunk. In some embodiments, the communication stack or a driver that mediates between the network adapter and the communication stack, is configured to produce a merged packet to be transferred to the client process, based on the headers stored in the header buffer and on one or more payloads stored in the given chunk.

There is additionally provided, in accordance with an embodiment that is described herein, a method for communication, including, in a network node that includes a network adapter coupled to a communication network, the network node including a host including a processor running a client process and a communication stack, receiving by the network adapter packets from the communication network, and classifying the received packets into respective flows that are associated with respective chunks in a receive buffer. Payloads of the received packets are distributed among the chunks so that packets classified to a given flow are stored in a given chunk assigned to the given flow. The communication stack is notified of the payloads in the given chunk, for transferring the payloads in the given chunk to the client process.

There is additionally provided, in accordance with an embodiment that is described herein, a network adapter that includes a network interface, a host interface and a packet processing circuitry. The network interface is configured to connect to a communication network. The host interface is coupled to a host including a processor running a client process and a communication stack. The packet processing circuitry is configured to receive packets from the communication network, and classify the received packets into respective flows that are associated with respective chunks in a receive buffer, to distribute payloads of the received packets among the chunks so that packets classified to a given flow are stored in a given chunk assigned to the given flow, and to notify the communication stack of the payloads in the given chunk, for transferring the payloads in the given chunk to the client process.

There is additionally provided, in accordance with an embodiment that is described herein, a method for communication, including, in a network adapter that connects to a communication network, and to a host that includes a processor running a client process and a communication stack, receiving packets from the communication network, and classifying the received packets into respective flows that are associated with respective chunks in the receive buffer. Payloads of the received packets are distributed among the chunks so that packets classified to a given flow are stored in a given chunk assigned to the given flow. The communication stack is notified of the payloads in the given chunk, for transferring the payloads in the given chunk to the client process.

These and other embodiments will be more fully understood from the following detailed description of the embodiments thereof, taken together with the drawings in which:

DETAILED DESCRIPTION OF EMBODIMENTS

Overview

Figure 1:
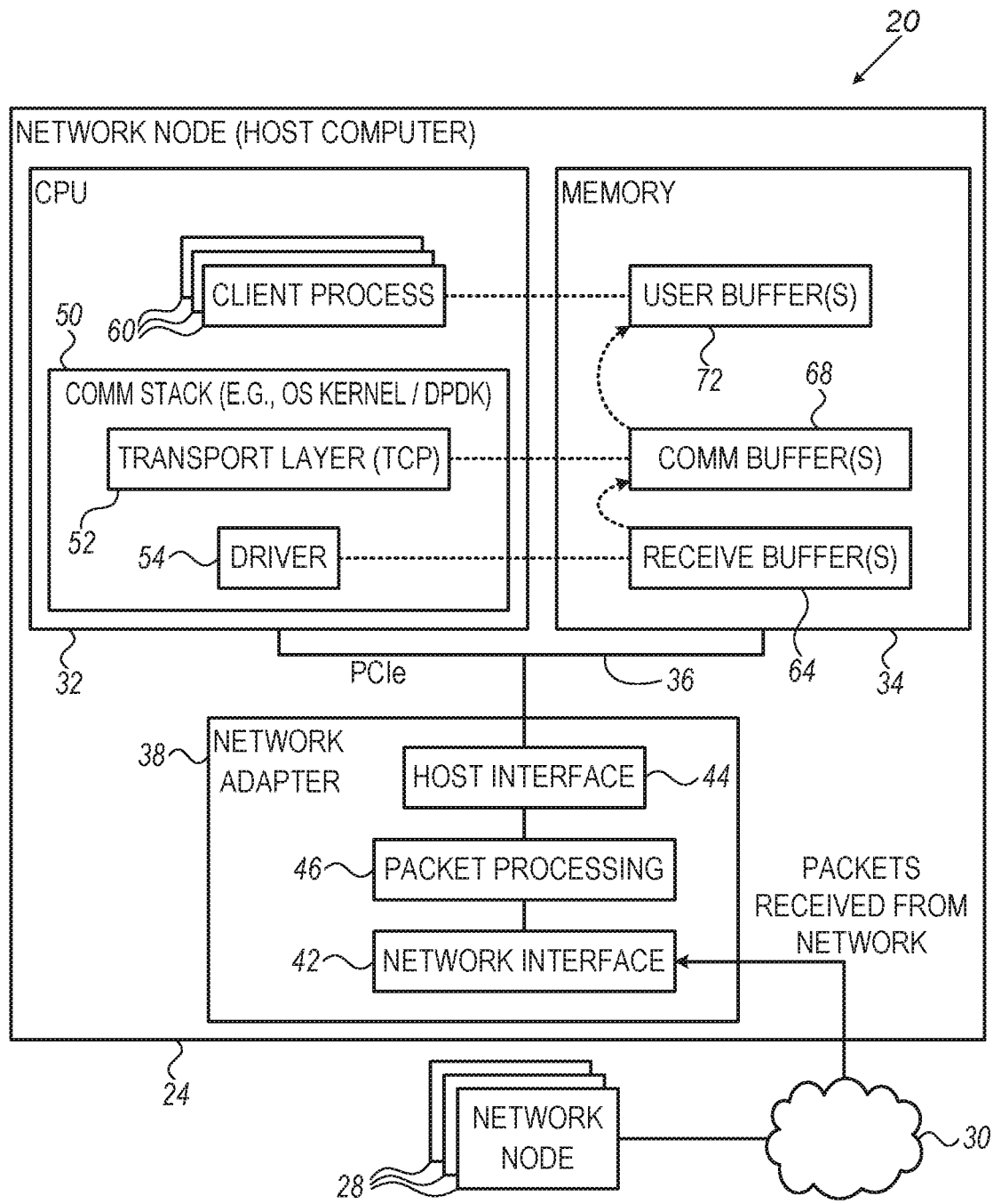
FIG. 1 is a block diagram that schematically illustrates a computing system, in which a network adapter provides a host with hints for coalescing received packets, in accordance with an embodiment that is described herein.

Embodiments that are described herein provide systems and methods for coalescing packets based on hints generated by network adapter.

A network node typically comprises a host coupled to a communication network using a network adapter or Network interface Controller (NIC). The host comprises a processor such as a Central Processing Unit (CPU) and a memory. The network adapter receives packets from the communication network and forwards the received packets to upper software layers. The CPU typically runs a communication stack, a driver that mediates between the network adapter and the communication stack, and client processes such as user application programs.

The communication stack may be comprised in a kernel program of an underlying Operating System (OS), e.g., the Linux OS. In an alternative embodiment, a Data Plane Development Kit (DPDK) can also be used. The DPDK runs in user space and provides open source libraries and network adapter drivers for offloading packet processing from the operating system kernel. The DPDK project is managed by the Linux Foundation. Further alternatively, any other suitable communication stack can also be used.

In the description that follows, it is assumed that user application programs, client processes, and the DPDK have access to a region in memory referred to herein as a "user space," and that the kernel program has access to a different region in memory, referred to herein as a "kernel space." In kernel-based communication, packets received from the communication network via the network adapter are conventionally first buffered in the kernel space and then transferred by the kernel program to the user space. In construct, DPDK bypasses the kernel program and transfers received data directly to user space.

In kernel-based communication, to receive data from the communication network, a client process provides the kernel with a socket buffer and the amount of data to be consumed. The network adapter receives from the communication network packets destined to the client process and stores them in the socket buffer. The kernel then copies the data from the socket buffer (or from a buffer pointed to by the socket buffer) to user space memory that is accessible by the client process. The copy operation to the user space may be costly in terms of CPU cycles, communication throughput and latency.

Packets received from the communication network typically have a limited size. The size limitation known as Maximum Transfer Unit (MTU) defines the size of the largest packet that can be sent over the wire an the underlying network, e.g., 1.5 Kbytes. Handling small packets requires extensive processing, incurs high latency, and degrades throughput, because the headers of the packets are processed separately.

In principle, to improve performance, e.g., as in the Large Receive Offload (LRO) method, multiple packets of a common data flow may be merged to produce a larger packet to be processed by higher layers of the networking stack. The main disadvantage of the LRO and similar methods, is that the communication stack receives only the large merged packet and has no flexibility in controlling the packet merging process.

In the disclosed embodiments, the network adapter separately stores the header and payload of each received packet. The network adapter reports to the communication stack (e.g., via the driver) payloads of multiple packets belonging to a common flow and the corresponding headers. The communication stack or the driver may combine some or all of the reported payloads to create at least one merged packet comprising two or more reported payloads, wherein the header of the merged packet is based on the reported headers.

The Linux 4.18 release of August 2018 introduced a receive zero-copy feature. The Linux feature supports zero-copy only to a contiguous memory region that is aligned to the operating-system pages and whose size equals an integer multiple of the operating-system page size (e.g., 4 Kbytes). The Linux zero-copy feature applies memory address mapping techniques. In some embodiments, the zero-copy feature is implemented within the underlying communication protocol such as the Transmission Control Protocol (TCP).

Kernel zero-copy transfer may be invoked, for example, by communicating packets having a payload size that is equal to the operating-system page size. Such a configuration, however, is limited and excludes important use cases such as, for example, using an operating-system page size of 4 Kbytes and a Maximum Transfer Unit (MTU) of 1.5 Kbytes. The MTU is often configured to 1.5 Kbytes, which makes it impossible to send packets having the size of the operating system pages (4 Kbytes, for example). One drawback of using a relatively small MTU, is that a source needs to break a large amount of data into multiple smaller units that are each sent in a separate packet, to meet the MTU constraint. This consumes network bandwidth and processing resources due to the multiple packet headers.

In principle, the MTU value could be increased. This, however, is typically impossible in many practical use cases. Moreover, even if the MTU could be configured to about 4 Kbytes, using the kernel zero-copy feature requires to scatter only the payloads of the packets to the socket buffer (excluding the headers) with alignment to operating system pages.

In some disclosed embodiments, the communication stack is comprised in a kernel program that applies zero-copy data transfer to a user space, only to data that is aligned in the memory to operating-system pages and has page-granularity. The network adapter applies novel buffering schemes to incoming packets, so as to force invoking the kernel zero-copy feature.

In some embodiments, a network node comprises a network adapter and a host. The network adapter is coupled to a communication network. The host comprising a processor running a client process and a communication stack. The network adapter classifies received packets into respective flows that are associated with respective chunks in a receive buffer. The network adapter distributes payloads of the received packets among the chunks so that packets classified to a given flow are stored in a given chunk assigned to the given flow, and notifies the communication stack of the payloads in the given chunk, for transferring the merged packet to the client process.

In the present context, a "flow" comprises a sequence of packets originating in a common source and destined to a common target. A flow may be identified by predefined one or more fields in the packet header.

In some embodiments, the processor is further configured to run a driver that mediates between the network adapter and the communication stack, and the network adapter is configured to notify the communication stack of the payloads in the given chunk, via the driver. The driver constructs a coalesced payload that includes two or more consecutive payloads in the given chunk and notifies the communication stack of the coalesced payload. In one embodiment, the payloads in the given chunk include first and second payloads that meet a matching criterion for coalescing, but the driver refrains from coalescing the first and second payloads based on a criterion other than the matching criterion.

In an embodiment, first and second payloads in the given chunk belong to packets of different respective flows. This may occur when multiple flows identifiers are hashed into a common hash result. In such cases, the network adapter notifies the driver that the first and second payloads mismatch for coalescing. The network adapter additionally stores headers of the received packets in the header buffer and notifies the communication stack of the stored headers corresponding to payloads of the received packets in the given chunk. The communication stack, or the driver that mediates between the network adapter and the communication stack, produces a merged packet to be transferred to the client process, based on the headers stored in the header buffer and on one or more payloads stored in the given chunk.

Each chunk has a limited storage space in the receive buffer. In response to detecting that the storage space available in the given chunk is smaller than a payload to be stored in the given chunk, the network adapter assigns to the given flow another chunk, and stores the payload in the another chunk. Alternatively, the network adapter splits storage of the payload between the chunk and the other chunk.

In some embodiments, the received packets belong to at least first and second flows, and the network adapter assigns to the first and second flows different respective chunks in the receive buffer.

In an embodiment, the communication stack applies direct data transfer of two or more payloads stored contiguously in the chunk to a user space. When the receive buffer resides in a memory of the host, the communication stack may apply direct data transfer (e.g., zero-copy transfer) only when the two or more payloads (i) are aligned in the receive buffer to the operating-system pages and (ii) having an operating-system page granularity.

In an embodiment, the communication stack is included in a kernel of an operating system running in a kernel space, and the communication stack is configured to transfer one or more payloads in the given chunk to the client process in a user space. In another embodiment, the communication stack includes a communication program running in a user space, and the communication stack is configured to transfer one or more payloads in the given chunk directly to the client process in the user space.

In the disclosed techniques, the network adapter stores payloads of received packets belonging to a common flow in a same chunk. The network adapter reports the payloads in the chunk and matching hints between consecutive payloads to a communication stack, e.g., via a driver. The communication stack or the driver has the flexibility to construct one or more merged packets from the reported payloads. Processing merged packets comprising respective coalesced payloads is typically more efficient than processing the individual packets and therefore by using the disclosed embodiments communication throughput is increased.

System Description

FIG. 1 is a block diagram that schematically illustrates a computing system 20, in which a network adapter provides a host with hints for coalescing received packets, in accordance with an embodiment that is described herein.

In computing system 20, network node 24 communicates with network nodes 28 over a communication network 30. Communication network 30 may comprise any suitable packet network such as, for example, an Ethernet network or an IP network such as the Internet. Communication network 30 may operate using any suitable communication protocol(s) such the Internet Protocol (IP), the Transmission Control Protocol (TCP) or both. In another embodiment, communication network comprises the InfiniBand™ (IB) fabric, in which case packets are communicated using the TCP and the IP over IB (IPoIB) protocols.

Computing system 20 may be used in any application in which network nodes exchange large amounts of data, such as, for example, High-Performance Computing (HPC) distributed computation and data centers, to name a few.

Network node 24 comprises a processor, in the form of a central processing unit (CPU) 32, and a memory 34, which are interconnected by a suitable bus 36. In the present example bus 36 comprises a Peripheral Component Interconnect Express (PCIe) bus. Network node 24 further comprises a network adapter 38 for connecting to communication network 30, such as a Network Interface Card (NIC). The combination of CPU 32, memory 34 and bus 36 (with or without the network adapter) is also referred to as a "host computer" or simply "host", for brevity. Memory is also referred to as a "host memory" or "system memory."

Network adapter 38 comprises a network interface 42, which is coupled to communication network 30, and a host interface 44, coupled via bus 36 to CPU 32 and memory 34. Packet processing circuitry 46, coupled between network interface 42 and host interface 44, generates outgoing packets for transmission over communication network 30 and processes incoming packets received from the communication network, as will be described below. In the ingress direction, packet processing circuitry 46 applies to packets received in the network element via network interface 42, various processing such as verifying the correctness of the data in the packet payload, packet classification and prioritization, and routing. The packet processing circuitry typically checks certain fields in the packets' headers for the purpose of packet classification and routing. The header fields contain addressing information, such as source and destination addresses and port numbers, and the underlying network protocol used.

Network interface 42, host interface 44 and packet processing circuitry 46 typically comprising dedicated hardware logic. Alternatively or additionally, at least some of the functions of packet processing circuitry 46 may be implemented in software on a suitable programmable processor.

CPU 32 runs a communication program 50 that handles host communication over network communication 30 via network adapter 38. Communication program 50 is also referred to herein as a "communication stack." Communication stack 50 may be comprised, for example, in a kernel program that is part of an Operation System (OS) (not shown) such as "Linux." Alternatively, the communication stack bypasses the kernel program, such as, for example, the Data Plane Development Kit (DPDK). The DPDK is an open source software managed by the Linux Foundation. The DPDK enables higher packet throughput than the Linux kernel which is driven by interrupts generated by the network adapter.

Communication stack comprises a communication protocol including a transport layer 52, e.g., the TCP. A driver 54 runs below transport layer 52 and mediates between communication stack 50 and network adapter 38.

Client processes 60 (also referred to simply as for brevity) running on CPU 32, such as processes generated by application software, communicate with peer clients (not shown) running on remote network nodes 28.

As will be described in detail below, in receiving packets from communication network 30, driver 54 manages allocation of resources such as buffers and queues to be used by network adapter 38 for packet reception. In some embodiments, network adapter 38 stores the payloads of multiple packets in receive buffer(s) 64, in alignment to the operating-system pages. Driver 54 monitors packet reception in receive buffers 64, and initiates data transfer from a receive buffer, e.g., via communication buffer 68, to a user buffer 72 in the user space, which is accessible by the relevant client process. Communication buffer 68 may comprise, for example, a TCP Socket Buffer (SKB). In some embodiments, as will be described in detail below, the communication stack supports zero-copy data transfer to user space, of buffered data that is stored in alignment to operating systems pages and in page granularity.

The computing system, network node and network adapter configurations shown in FIG. 1 are example configurations, which are chosen purely for the sake of conceptual clarity. In alternative embodiments, any other suitable computing system, network node and network adapter configurations can also be used. Elements that are not necessary for understanding the principles of the present invention, such as various interfaces, addressing circuits, timing and sequencing circuits and debugging circuits, have been omitted from the figure for clarity.

Some elements of network adapter 38, such as packet processing 46, may be implemented in hardware, e.g., in one or more Application-Specific integrated Circuits (ASIC) or FPGAs. Additionally or alternatively, packet processing circuitry 46 can be implemented using software, or using a combination of hardware and software elements. Memory 34 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of network adapter 38, may be carried out by a general-purpose processor, e.g., packet processing circuitry 46, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Receive Buffers Management

Figure 2:
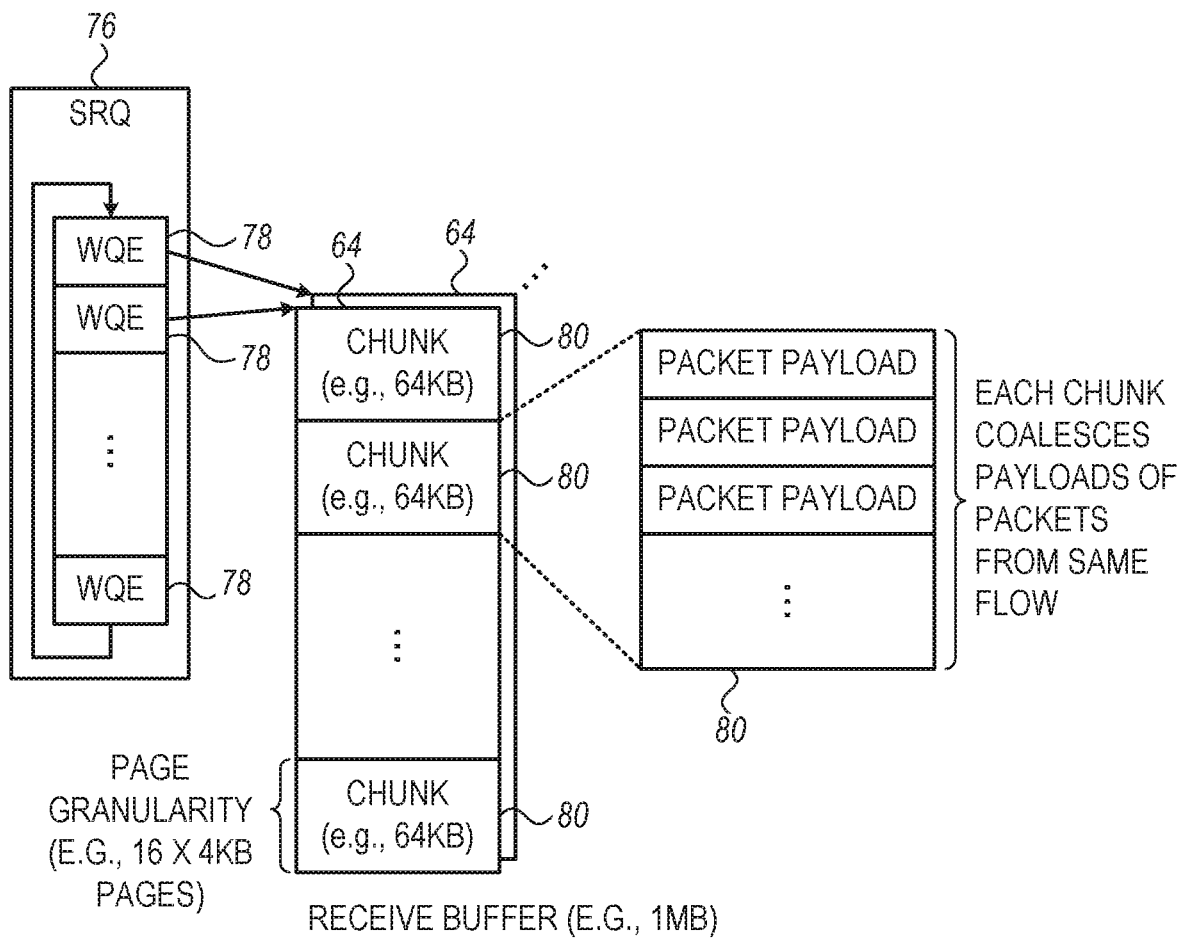
FIG. 2 is a diagram that schematically illustrates receive buffers divided into multiple chunks for storing payloads of received packets, in accordance with an embodiment that is described herein.

FIG. 2 is a diagram that schematically illustrates receive buffers divided into multiple chunks for storing payloads of received packets, in accordance with an embodiment that is described herein.

In FIG. 2, a cyclic Shared Receive Queue (SRQ) 76 comprises multiple Work Queue Elements (WQEs) 78, each WQE comprises a pointer to a respective receive buffer 64. In some embodiments, a WQE stores information regarding chunk usage, e.g., the occupancies of the chunks currently being used and the next available chunk in the receive buffer.

In some embodiments, driver 54 creates SRQ 76 at initialization, e.g., after reset, and posts multiple WQEs 78 to the SRQ before starting packet reception. The network adapter then executes the posted WQEs sequentially (and cyclically). When the currently used receive buffer becomes full, the network adapter switches to a subsequent WQE pointing to a free receive buffer. In some embodiments, network adapter 38 automatically re-posts consumed WQEs to SRQ 76, thus freeing the clients from being engaged with posting WQEs. In some embodiments, network adapter 38 may add WQEs to or remove WEQs from SRQ 76, as required.

In some embodiments, receive buffer 64 comprises (or divided into) multiple chunks 80, wherein each chunk comprises a contiguous range of addresses in memory 34. In some embodiments, chunks 80 are aligned to the operating-system pages, meaning that the starting address of a chunk 80 in memory 34 is aligned to the address of a corresponding operating-system page. In the description that follows an "operation-system page" is simply referred as "page" for brevity.

In the present context, a region in memory 34 whose starting address is aligned to a corresponding page of the operating system is referred to herein as being "page-aligned." When the size of a page-aligned region is an integer multiple of the operating-system page size, the region also referred to as having a "page-granularity."

In some embodiments, chunks 80 are page-aligned and have page-granularity. In the example of FIG. 2, the receive buffer has a contiguous range of addresses that is divided into the multiple chunks. In an example embodiment, the size of the operating-system pages is 4 Kbytes, the chunk size is 64 Kbytes (16 pages), and the size of the receive buffer is 1 Mbytes (16 chunks).

When a chunk 80 is page-aligned, a contiguous region of addresses starting at the beginning of that chunk and that has a page-granularity, will be zero-copied by the communication stack 50 to the user space (e.g., when zero-copy is supported and enabled). On the other hand, when the size of the contiguous region is not an integer multiple of the operating-system page size, a first part of the region having a page-granularity will be zero-copied, and the remaining part of the region (that is smaller than the page size) will be conventionally copied to the user space. Therefore, for increasing the amount of data that is zero-copied, chunks 80 should be configured to both being page-aligned and having page-granularity.

As will be described below, network adapter 38 stores in chunks 80 only payloads of incoming packets (and stores the headers of the incoming packets separately). In the disclosed embodiments, any suitable payload size can be used, and different packets may have payloads of same or different sizes.

Although in FIG. 2, all of chunks 80 have a common size, this configuration is not mandatory. In alternative embodiments, chunks of different sizes can also be used. For example, the chunk size may depend on data rates and/or priorities of the flows.

Methods for Packet Buffering and Coalescing

Figure 3:
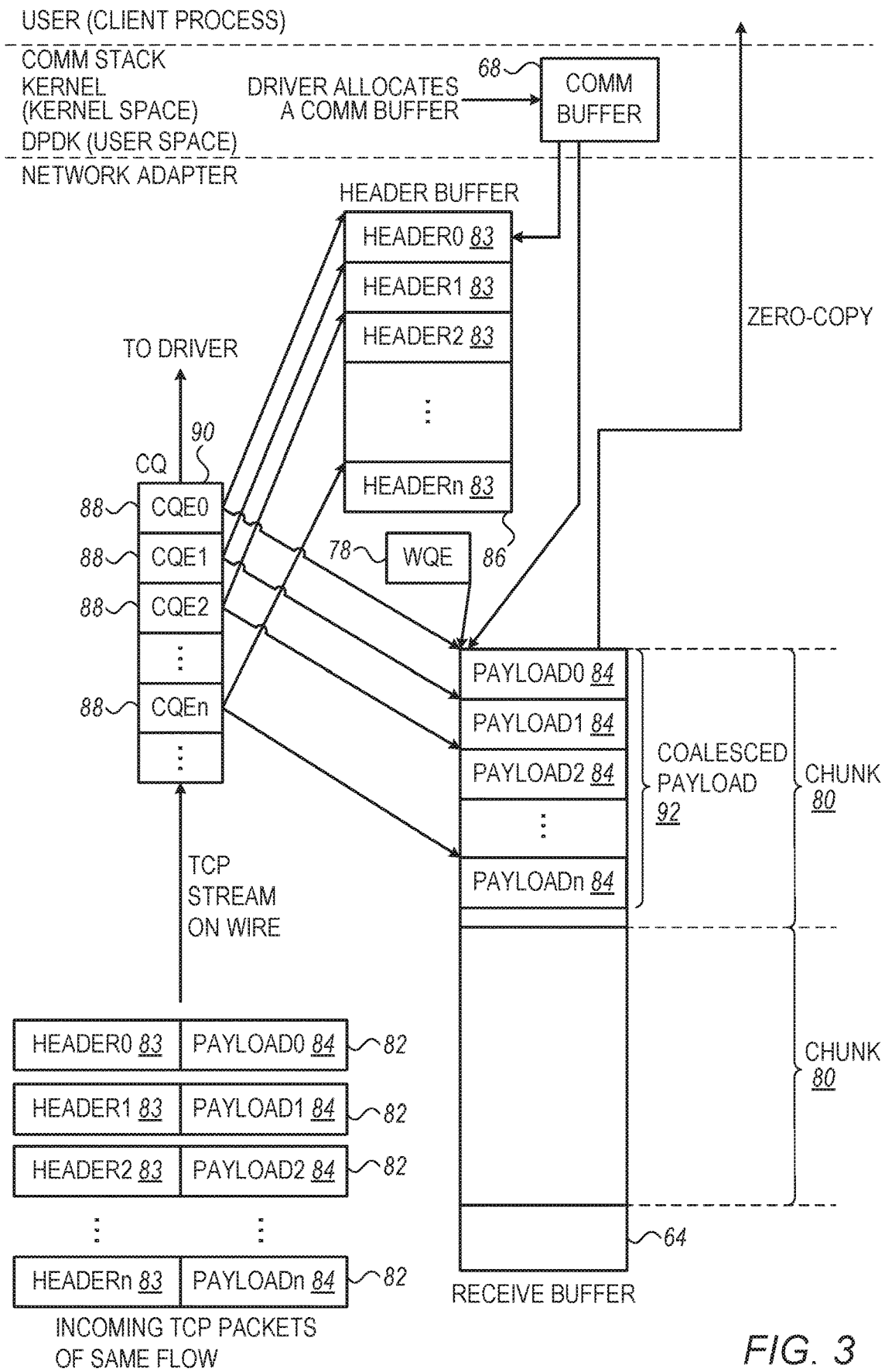
FIG. 3 is a diagram that schematically illustrates a scheme for buffering received packets belonging to a common flow, in accordance with an embodiment that is described herein.

FIG. 3 is a diagram that schematically illustrates a scheme for buffering received packets belonging to a common flow, in accordance with an embodiment that is described herein.

In FIG. 3, network adapter 38 receives packets 82 from communication network 30, each packet comprising a header 83 and a payload 84. Network adapter 38 processes packets 82 and splits each packet into its header and payload, to be stored separately. Specifically, the network adapter scatters headers 83 (e.g., sequentially) in a dedicated header buffer 86, and scatters payloads 84 of the same flow contiguously in a chunk 80 of receive buffer 64. The network adapter stores the first payload at the beginning of the chunk, the second payload immediately after the first payload and so on. The payloads scattered in the same chunk form a large coalesced payload 92.

In some embodiments, the network adapter selects one of headers 83 in header buffer 86 as a header of a large packet comprising coalesced payload 92, and modifies the selected header accordingly. Alternatively, the network adapter generates a header for coalesced payload 92 independently of headers 83. By coalescing multiple payloads in a chunk, a large amount of data may be efficiently transferred) by the communication stack to the user space, or zero-copied in a single data transfer operation. Moreover, the underlying transport layer 52 (e.g., TCP) receives a large packet rather than multiple smaller packets thus reducing the overhead incurred by transferring and processing all of the packets' headers.

Note that in some applications, to send a large message over the communication network, the source of the packets needs to break the message into multiple payloads to be transmitted within multiple packets so as to meet an MTU limitation of the network. Using the coalescing mechanism described above, the network adapter at the receiving side, reproduces the large message (or part thereof) by storing the relevant payloads contiguously in a chunk, as described above.

For each received packet 82, network adapter 38 identifies the relevant receive buffer pointed to by the current WQE 78. As will be described below, the network adapter scatters the packet payload in a chunk of the receive buffer that has been assigned to the flow to which the packet belongs.

In some embodiments, network adapter 38 generates for each packet 82 that has been split into separate header and payload and buffered as described above, a Completion Queue Element (CQE) 88, and writes the COE to a Completion Queue (CQ) 90. For a given packet 82, CQE 88 may store information such as a chunk identifier, the starting address of each payload within the chunk, sizes of the stored payloads and the like. As will be described in more detail below, the CQE may also store an indication of whether the payload matches a previous payload in the chunk for coalescing, using suitable matching criteria. The information in the CQEs provides hints to driver 54 for deciding on coalescing payloads in the chunk into one or more coalesced payloads (92).

In some embodiments, driver 54 monitors CQEs 88 for deciding on closing the current chunk and initiating the transfer of the chunk content to the user space. In some embodiments, when driver 54 identifies that the current chunk becomes full or close to full, driver 54 allocates a Socket Buffer (SKB) 68 that points to (i) coalesced payload 92 and (ii) modified header 83. Communication stack 50 then transfers coalesced payload 92 to the user space.

When the communication stack supports zero-copy data transfer, and zero-copy is enabled, the communication stack transfers the coalesced payload (or part thereof having page-granularity) to the user space. In case the size of coalesced payload 92 is not an integer multiple of the page size, part of the coalesced payload having a granularity will be zero-copied to the user space, and the remaining part of the coalesced payload will be conventionally copied to the user space.

Figure 4:
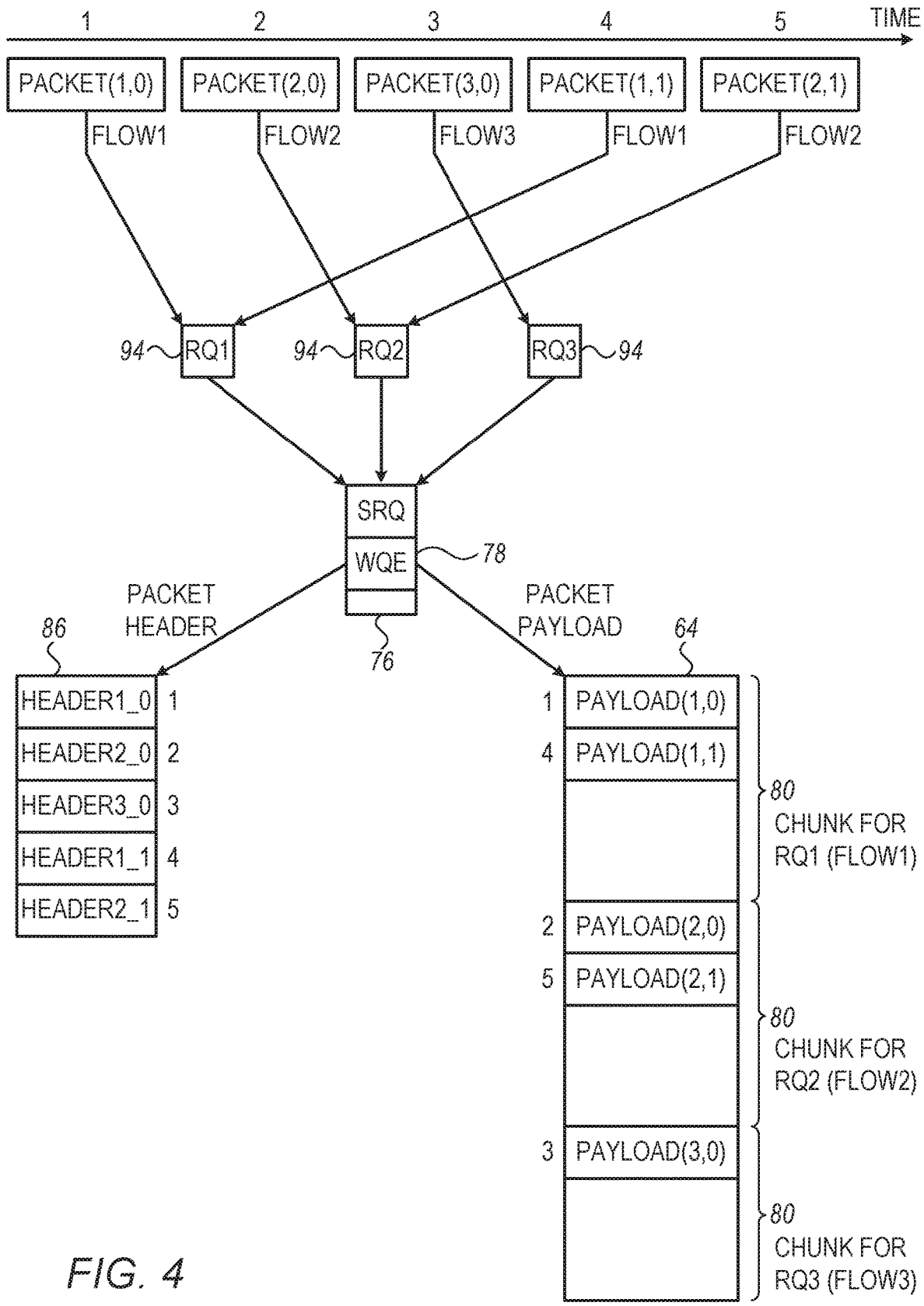
FIG. 4 is a diagram that schematically illustrates a scheme for buffering received packets belonging to multiple flows, in accordance with an embodiment that is described herein.

FIG. 4 is a diagram that schematically illustrates a scheme for buffering received packets belonging to multiple flows, in accordance with an embodiment that is described herein.

In the example of FIG. 4, network adapter 38 receives from communication network 30, via network interface 42, packets belonging to multiple (three in the present example) flows denoted FLOW1, FLOW2 and FLOW3. In practical applications, depending on the underlying application, the packets may belong to just several concurrent flows, or alternatively, the packets may belong to a much larger number of concurrent flows, such as hundreds or even thousands flows.

In FIG. 4, the received packets are denoted PACKET(i,j), wherein 'i' denotes a flow identifier, and j=0, 1, 2, . . . denotes the sequence number of the packets within the flow. In the present example, five packets received by the network adapter 38 comprise PACKET(1,0) and PACKET(1,1) belonging to FLOW1, PACKET(2,0) and PACKET(2,1) belonging to FLOW2, and PACKET(3,0) belonging to FLOW3. In FIG. 4, the packets are also referenced by an index in the range 1 . . . 5, which is indicative of the order in which the packets were received.

In some embodiments, a WQE 78 currently used, holds a pointer to receive buffer 64 and another pointer to a header buffer 86. These pointers may be provided to the network adapter by driver 54.

In some embodiments, driver 54 allocates for each of the flows received, a respective Receive Queue (RQ) 94. The RQ is associated with a respective flow context holding a flow identifier of the flow served by the RQ. At any given time, the network adapter assign to each RQ (or to the flow served by that RQ) a respective chunk 80 in receive buffer 64. The flow context of the RQ holds a chunk identifier to the current chunk. The CQEs associated with the chunk hold information regarding the addresses and sizes of the payloads already stored in the current chunk, and matching information for coalescing between pairs of consecutives payloads in the chunk.

Network adapter 38 classifies the received packets to the respective flows to which they belong and steers the packets to relevant RQs serving these flows. The network adapter stores the packet header in header buffer 86 and stores the packet payload in the current chunk used. In some embodiments, the network adapter stores payloads of packets belonging to a common flow contiguously in the same chunk. When closing a current chunk and assigning a new chunk to a flow, the network adapter starts storing payloads of subsequent packets, sequentially and contiguously in the new chunk. In FIG. 4, payloads of the same flow are coalesced into a large payload as described above with reference to FIG. 3.

Although omitted from FIG. 4 for clarity, the network adapter writes CQEs indicative of stored payloads, described above with reference to FIG. 3.

In FIG. 4, the network adapter stores the payloads of the packets belonging to FLOW1, FLOW2 and FLOW3 in separate respective chunks as follows. In the chunk corresponding to FLOW1, the network stores the first and fourth received packets. In the chunk corresponding to FLOW2, the network adapter stores the second and fifth received packets. In the chunk corresponding to FLOW3, the network adapter stores the third received packet.

Figure 5:
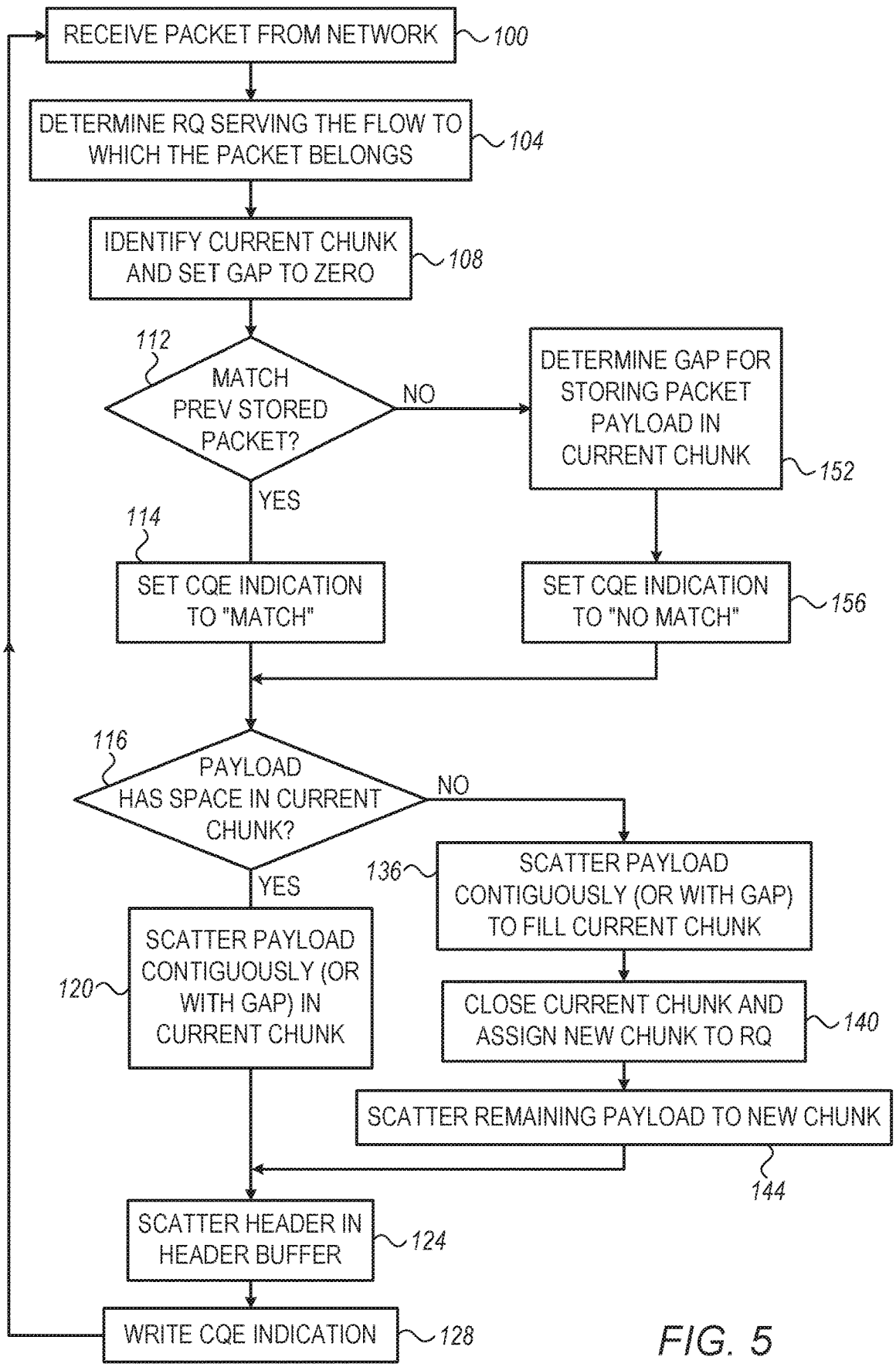
FIG. 5 is a flow chart that schematically illustrates a method for coalescing packets in chunks, in accordance with an embodiment that is described herein.

FIG. 5 is a flow chart that schematically illustrates a method for coalescing packets in chunks, in accordance with an embodiment that is described herein.

In describing the method, it is assumed that the network adapter receives packets belonging to one or more flows that are served by respective RQs. Moreover, each RQ is assigned a respective chunk in a common receive buffer 64. The chunks are assumed to be page-aligned and having page-granularity.

The method will be described as carried out by network adapter 38 (or more specifically by packet processing circuitry 46).

The method begins with network adapter 38 receiving a packet from communication network 30, via network interface 42, at a packet reception step 100. The packet may comprise, for example, a TCP packet or a TCP/IP packet. In another embodiment, instead the TCP, the User Datagram Protocol (UDP) can also be used. At a RQ determination step 104, the network adapter steers the packet to a RQ serving the flow to which the received packet belongs. In some embodiments, the network adapter determines the RQ by applying a hash function to one or more fields in the packet header. The hash function may comprise, for example, a Toeplitz hash function. The network adapter applies the hash function, for example, to a five-tuple in the packet header comprising (protocol, source address, source port, destination address, destination port).

At a chunk identification step 108, the network adapter extracts from the RQ flow context, an identifier (e.g., a pointer or a chunk index) of the current chunk used for the flow served by the RQ. Further at step 108, the network adapter sets a gap variable to a zero value, which means storing the payload of the received packet immediately after the previously stored payload. At a match checking step 112, the network adapter checks whether the current packet matches the previously stored packet for coalescing. The purpose of the match checking is to identify sequences of packets whose payloads can be coalesced (by the driver) into a large packet. Checking for a match at step 112 may be carried out in various ways. For example, a match occurs when the packet of the recently stored payload and the currently received packet have consecutive sequence numbers.

Another matching criterion checks whether the flow served by the RQ (determined at step 104) matches (e.g., has the same flow identifier, e.g., a five-tuple value as) the flow to which the received packet belongs. This matching criterion is required because the hash function may be imperfect and cause hash collisions, meaning that hashing different five-tuples (or other predefined fields in the packet header) may result in the same hash outcome and therefore also with the same RQ. Hash collisions may also occur when the number of RQs is smaller than the supported number of flows.

When a match occurs at step 112, the network adapter proceeds to a match indication step 114, at which the network adapter sets a CQE indication variable to "match." At a chunk occupancy checking step 116, the network adapter checks whether the remaining storage space in the current chunk is large enough for storing the payload of the received packet (possibly including a nonzero gap). If so, and if the gap value is zero, network adapter 38 contiguously scatters the entire payload of the received packet in the current chunk subsequently to already stored payloads, if any, at a full payload storing step 120.

At a header storage step 124, the network adapter scatters the header of the received packet in header buffer 86. At a completion step 128, the network adapter writes a CQE to CQ 90. In an embodiment, the CQE stores a state or status value indicative of whether a match occurred at step 112 above. At step 128, the network adapter sets the status value in the CQE to the current value of the CQE indication variable. Following step 128, the method loops back to step 100 to receive a subsequent packet.

When at step 116 the remaining storage space in the chunk is smaller than the payload size, network adapter 38 may scatter the entire payload to a new chunk, in one embodiment, or alternatively, split the payload between the current chunk and a new chunk as described herein at steps 136, 140 and 144.

At a chunk filling step 136, the network adapter contiguously scatters part of the payload to the current chunk up to filling the entire chunk (possibly after a nonzero gap). At a new chunk allocation step 140, the network adapter closes the current chunk, and assigns to the RQ a new chunk that is available in the receive buffer.

At a new chunk scattering step 144, the network adapter scatters to the new chunk the remaining part of the payload that was not scattered to the closed chunk.

Following step 144, the method proceeds to step 124, to write the header of the received packet, followed by writing a CQE (with the current CQE indication value) at step 128 as described above.

When at step 112 no match occurs, the network adapter prepares for storing the packet payload in the current chunk, contiguously (gap value is zero) or with a nonzero gap relative to the previously stored payload, at a gap determination step 152. The gap size may be configured, for example, to one or more Bytes, or to the system page size. In some embodiments, the gap is selected so that the payload of the current packet will be stored aligned to the operating-system pages or to the system cache-line. When there is no space for the current payload in the current chunk, the network adapter closes the current chunk and assigns to the RQ a new chunk in the receive buffer. When the current chunk contains packets of two different flows, only parts of the two flows aligned to the operating-system pages and having page-granularity may be zero-coped by the communication stack to the user space.

Note that using a nonzero gap is not mandatory. In alternative embodiments, the payload of the current packet may be stored contiguously to the previous payload of a different flow. With or without a gap, the CQE reports the starting and ending addresses of the payloads belonging to the different flows, and the two payloads will thus be copied separately to the user space. In these embodiments, the communication stack applies data transfer from a receive buffer to a user space. Hardware circuitry in the network adapter contiguously stores payloads of packets classified to a given flow in a chunk of the receive buffer assigned to the given flow, so as to cause the communication stack to transfer up to an entire chunk of the contiguously-stored payloads to the user space.

At a no-match indication step 156, network adapter 38 sets the network adapter sets a CQE indication variable to "no match." The "no match" indication will be reported in the status value of the CQE at step 128, as described above. Following step 160, the method proceeds to step 116 and further steps to store the payload and header of the received packet in the current or new chunk.

Packet Coalescing by Driver

In the LRO method mentioned above, the transport layer receives a complete merged packet. In contrast, driver 54 receives from network adapter 38 per-packet information regarding the payloads, headers and matching hints of the received packets. Using such detailed information, driver has the flexibility in determine packet coalescing, which could not be achieved otherwise. For example, the driver may decide not to coalesce consecutive payloads in a chunk even when the network adapter notifies that the payloads are matching for coalescing. In general, the driver does not coalesce mismatching payloads but is free to refrain from coalescing matching payloads, e.g., using a criterion other than the matching criterion used by the network adapter.

In one embodiment, the driver determines the number of packets (or payloads) to coalesce depending on the CPU load. For example, the driver increases the number of coalesced packets as the CPU load increases. Since in the disclosed techniques the network adapter coalesces packets in a "best effort" approach, the likelihood of having pending packets in the receive buffers of the network adapter while the CPU is free to handle them reduces significantly. Note that the network adapter sends the processed and coalesced packets immediately to the host together with completion notifications without further storage in the network adapter.

In some embodiments, the communication stack is comprised in the Linux kernel, which supports the New API (NAPI). A driver using the NAPI provides a poll method to the kernel, for fetching multiple packets from the network adapter. In a NAPI poll cycle, the kernel thus receives multiple packets from the network adapter via the driver.

The embodiments described above are given by way of example, and other suitable embodiments can also be used.

Although the embodiments described herein mainly address storing payloads of packets received from a network, aligned to system pages, to force usage of the Linux zero-copy feature, the methods and systems described herein can also be used in other applications, such as in other applications that require fast data transfer to user space wherein the underlying communication stack supports zero copy data transfer.

In the embodiments that were described above, payloads of multiple packets are mainly coalesced to produce a large payload that when satisfies alignment and page-granularity conditions, as described above, is zero-copied efficiently to user space. A packet header is associated with this large payload to be provided to the TCP as a corresponding large packet. In other embodiments, coalescing multiple payloads of received packets to produce a large packet that is efficiently provided to the TCP is independent of the alignment of this large payload in memory or whether the large payload is transferred to user space using standard copy or using zero-copy.

In the embodiments described above, a receiver buffer for storing payloads of incoming packets and a header buffer for storing headers of the incoming packets reside in the host. This, however, is not mandatory. In alternative embodiments, the receive buffer and the header buffer may reside in the network adapter, in a Graphics Processing Unit (GPU) or in a memory of any other element so that the receiver buffer and the header buffer are accessible by the network adapter and by the host.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network node, comprising:
 a network adapter coupled to a communication network; and
 a host comprising a processor running a client process, an operating system and a communication stack;
 wherein the network adapter is configured to:
  receive packets from the communication network, and classify the received packets into respective flows that are associated with respective chunks in a receive buffer;
  distribute payloads of the received packets among the chunks so that payloads of the received packets classified to a given flow are stored in a given chunk assigned to the given flow; and
  indicate to the host, packets of the received packets matching for coalescing,
  wherein the host is configured to decide whether to coalesce the packets indicated as matching for coalescing, and to produce a merged packet with a corresponding header of the merged packet, for the packets decided to be coalesced.

2. The network node according to claim 1, wherein when first and second payloads in the given chunk belong to packets of different respective flows, the network adapter is configured to notify the processor that the first and second payloads mismatch for coalescing.

3. The network node according to claim 1, wherein in response to detecting that a storage space available in the given chunk is smaller than a payload to be stored in the given chunk, the network adapter is configured to assign to the given flow another chunk, and to store the payload in the another chunk.

4. The network node according to claim 1, wherein in response to detecting that a storage space available in the given chunk is smaller than a payload to be stored in the given chunk, the network adapter is configured to assign to the given flow another chunk, and to split storage of the payload between the given chunk and the another chunk.

5. The network node according to claim 1, wherein the received packets belong to at least first and second flows, and wherein the network adapter is configured to assign to the first and second flows different respective chunks in the receive buffer.

6. The network node according to claim 1, wherein the communication stack is comprised in a kernel of an operating system running in a kernel space, and wherein the communication stack is configured to transfer one or more payloads in the given chunk to the client process in a user space.

7. The network node according to claim 1, wherein the communication stack comprises a communication program running in a user space, and wherein the communication stack is configured to transfer one or more payloads in the given chunk directly to the client process in the user space.

8. The network node according to claim 1, wherein the network adapter is configured to store headers of the received packets in a header buffer, and to notify the communication stack of the stored headers corresponding to payloads of the received packets in the given chunk.

9. The network node according to claim 8, wherein the communication stack, or a driver that mediates between the network adapter and the communication stack, is configured to produce the merged packet, based on the headers stored in the header buffer and on one or more payloads stored in the given chunk.

10. The network node according to claim 1, wherein the processor is configured to determine a number of payloads to coalesce depending on processor load in the host.

11. The network node according to claim 1, wherein the processor is configured to apply a matching criterion for coalescing first and second payloads, including verifying that the packets to which the first and second payloads belong are assigned consecutive respective sequence numbers.

12. The network node according to claim 1, wherein the communication stack is configured to select a part of the one or more payloads whose size is an integer multiple of a page-size of the operating system and in alignment with pages of the operating system of the host, and to transfer the part using zero-copy transfer.

13. The network node according to claim 1, wherein the chunks in the receive buffer have a size equal to an integer multiple of an operating-system page size and are in alignment with pages of the operating system of the host, and wherein the communication stack is configured to transfer at least part of the chunks to the client process using zero-copy transfer.

14. The network node according to claim 1, wherein the network adapter is configured to write respective completion queue elements (CQEs) for the received packets, each CQE including an indication of whether the payload of the respective packet of the CQE matches a previous payload in the chunk.

15. A method for communication comprising:
in a network node comprising a network adapter coupled to a communication network, the network node comprising a host comprising a processor running a client process, an operating system and a communication stack,
receiving by the network adapter packets from the communication network, and classifying the received packets into respective flows that are associated with respective chunks in a receive buffer;
distributing payloads of the received packets among the chunks so that payloads of the received packets classified to a given flow are stored in a given chunk assigned to the given flow;
indicating by the network adapter to the host, packets of the received packets matching for coalescing;
deciding by the host, whether to coalesce the packets indicated as matching for coalescing; and
producing by the host, a merged packet with a corresponding header of the merged packet, for packets decided to be coalesced.

16. The method according to claim 15, wherein when first and second payloads in the given chunk belong to packets of different respective flows, notifying the communication stack, via the driver, that the first and second payloads mismatch for coalescing.

17. The method according to claim 15, wherein in response to detecting that a storage space available in the given chunk is smaller than a payload to be stored in the given chunk, assigning to the given flow another chunk, and storing the payload in the another chunk.

18. The method according to claim 15, wherein in response to detecting that a storage space available in the given chunk is smaller than a payload to be stored in the given chunk, assigning to the given flow another chunk, and splitting storage of the payload between the chunk and the another chunk.

19. The method according to claim 15, wherein the received packets belong to at least first and second flows, and comprising assigning to the first and second flows different respective chunks in the receive buffer.

20. The method according to claim 15, wherein the communication stack is comprised in a kernel of an operating system running in a kernel space, and comprising transferring one or more payloads in the given chunk to the client process in a user space.

21. The method according to claim 15, wherein the communication stack comprises a communication program running in a user space and comprising transferring one or more payloads in the given chunk directly to the client process in the user space.

22. The method according to claim 15, and comprising storing headers of the received packets in a header buffer, and notifying the communication stack of the stored headers corresponding to payloads of the received packets in the given chunk.

23. The method according to claim 22, and comprising producing, by the communication stack, or by a driver that mediates between the network adapter and the communication stack, the merged packet, based on the headers stored in the header buffer and on one or more payloads stored in the given chunk.

24. The method according to claim 15, and comprising, determining, by the driver, a number of payloads to coalesce depending on processor load in the host.

25. The method according to claim 15, and comprising applying, by the driver, a matching criterion for coalescing first and second payloads, including verifying that the packets to which the first and second payloads belong are assigned consecutive respective sequence numbers.

26. The method according to claim 15, wherein transferring the at least part of the one or more payloads comprises selecting a part of the one or more payloads whose size is an integer multiple of a page-size of the operating system, and transferring the part using zero-copy transfer.

\* \* \* \* \*